(12) United States Patent
Breymaier

(10) Patent No.: US 6,561,576 B2
(45) Date of Patent: May 13, 2003

(54) ROOF LINING FOR A PASSENGER COMPARTMENT OF A MOTOR VEHICLE HAVING LATERAL IMPACT PROTECTION

(75) Inventor: Karl Breymaier, Senden/Iller (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/941,941

(22) Filed: Aug. 30, 2001

(65) Prior Publication Data
US 2002/0030387 A1 Mar. 14, 2002

(30) Foreign Application Priority Data
Aug. 30, 2000 (DE) .......................... 100 42 419

(51) Int. Cl.7 .............................................. B60R 22/00
(52) U.S. Cl. ....................................................... 296/214
(58) Field of Search ................... 296/189, 214

(56) References Cited
U.S. PATENT DOCUMENTS
6,173,990 B1 * 1/2001 Nakajima et al.
6,231,072 B1 * 5/2001 Pywell et al.
6,257,616 B1 * 7/2001 Nowak et al.
6,375,214 B1 * 4/2002 Nishikaji
2001/0040360 A1 * 11/2001 Ishiyama et al.

FOREIGN PATENT DOCUMENTS
DE 29603316 8/1996

* cited by examiner

Primary Examiner—D. Glenn Dayoan
Assistant Examiner—Scott Carpenter
(74) Attorney, Agent, or Firm—Crowell & Moring LLP

(57) ABSTRACT

A roof lining for a motor vehicle passenger compartment has a lining part disposed on a roof frame of the vehicle under which a lateral impact protection for an occupant is provided. An aperture is formed in the lining part for deployment of the lateral impact protection in the event of activation of the lateral impact protection. An axis of flexion is provided in the lining part and is formed by an elongated section of the lining part, having a lower material density than the adjoining regions.

16 Claims, 1 Drawing Sheet

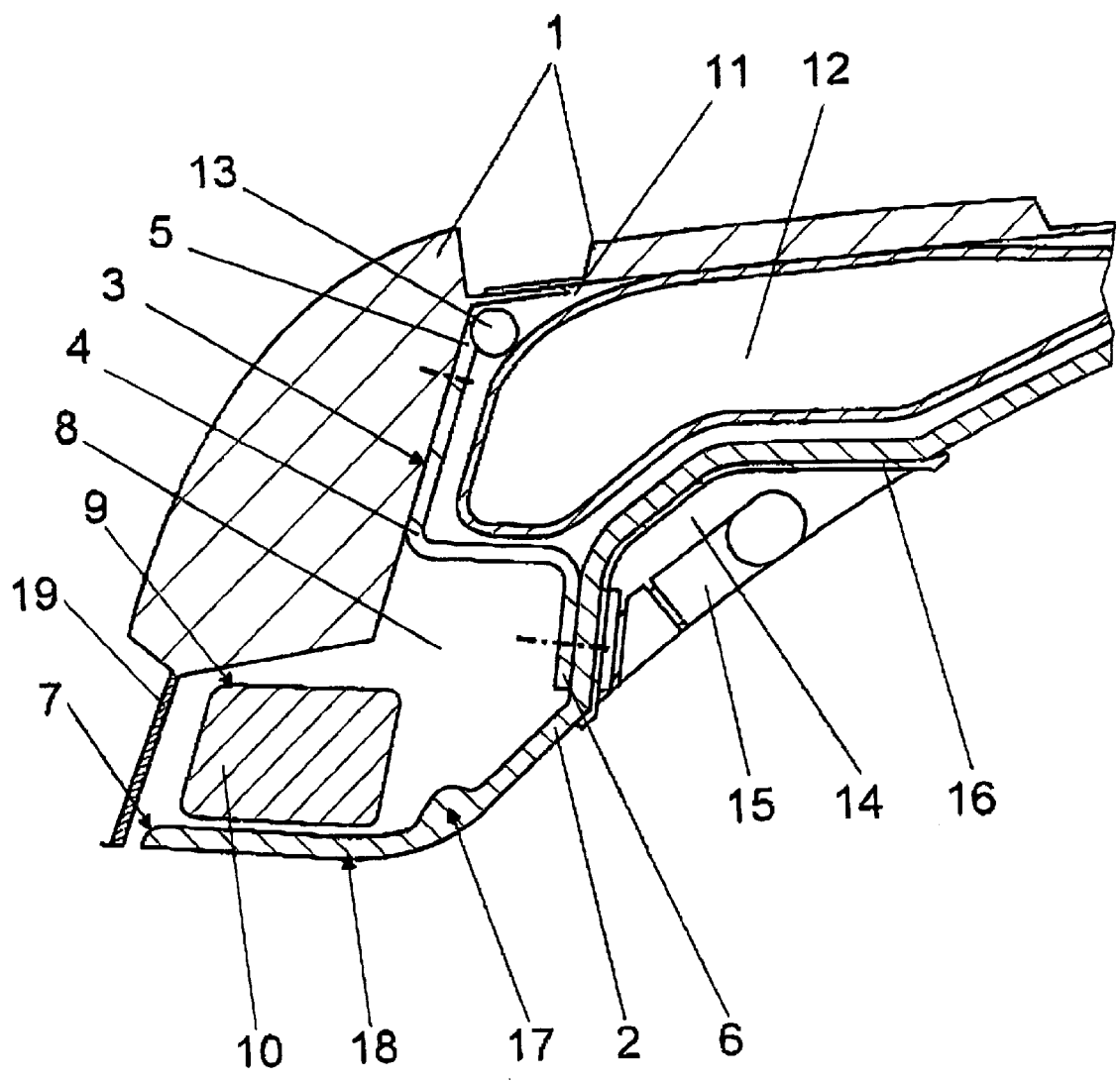

ROOF LINING FOR A PASSENGER COMPARTMENT OF A MOTOR VEHICLE HAVING LATERAL IMPACT PROTECTION

BACKGROUND OF THE INVENTION

This application claims the priority of German patent document DE 100 42 419.8, filed Aug. 30, 2000, the disclosure of which is expressly incorporated by reference herein.

The present invention relates to a roof lining for a passenger compartment of a motor vehicle, in particular a lining part disposed on a roof frame of the vehicle under which lateral impact protection for an occupant is provided, an aperture provided in the lining part for deployment of lateral impact protection in the event of activation of the lateral impact protection and an axis of flexion operatively arranged in the lining part.

Customarily, such a roof lining is secured on a roof frame in a passenger compartment of a vehicle. The known roof lining in motor vehicles is usually referred to in the German language as a "Himmel".

Such a roof lining which is known from practical use comprises at least one lining part that lines the roof frame or the roof of the motor vehicle from the inside. The lining part is disposed on the roof frame of the motor vehicle. To this end, for example, retaining elements can be provided to secure the lining part in various regions of the roof frame. In particular, the edge region of the lining part must be adequately connected to the roof frame. Otherwise a situation may arise in which the lining part hangs down in the edge region, inconveniencing the occupants of the vehicle.

In the course of further improvements to occupant protection, general provision has been made in a motor vehicle for what are known as lateral impact protection devices to be present in the vehicle. The occupants of the motor vehicle are subjected to a particularly high risk in the event of a lateral impact. As a result, vehicles are being fitted in a known manner with, for example, lateral impact protection for the occupants, inter alia.

DE 296 03 316 U1 discloses a lateral impact protection of the above-mentioned type. The lateral impact protection has an inflatable air bag designed as a head cushion and capable of being filled with gas, for example by means of a gas generator, in the event of a collision. The lateral impact protection is integrated into the roof lining, which has a cavity formed between the roof frame and the lining part. The lateral impact protection with the gas cushion is accommodated in this cavity. Thus the lateral impact protection is disposed under the lining part of the roof lining.

In the event of activation of the lateral impact protection, the gas cushion is designed, as a result of its opening operation, to deploy through the lining part of the known roof lining and open protectively between the side window of the motor vehicle and the occupants. In order to make it possible for the gas cushion to deploy through the lining part, the latter is provided at an appropriate location with a weakened portion of the lining in the form of a U-shaped notch (predetermined breaking point). In the event of an impending collision involving the motor vehicle, the lateral impact protection is triggered by appropriate detectors. As a result the cushion is filled with gas by the gas generator. As a result of the opening operation, the gas cushion can fold down the lining part of the roof lining along the line of weakness provided, so that the gas cushion can open completely within the passenger compartment of the motor vehicle between the side window and the occupants.

The weakening of the known lining by a U-shaped notch entails the disadvantage that the material of the lining is at least partially destroyed when the notch is made. The creates the risk that, because of the pressure developing during the operation of opening of the gas cushion, parts of the lining may tear away and be thrown into the passenger compartment of the motor vehicle, with possible injury to the occupants.

SUMMARY OF THE INVENTION

An object of the invention is to provide a roof lining for a passenger compartment of a motor vehicle, especially for a motor vehicle, which is further improved in terms of the safety of the occupants of the vehicle.

This object has been achieved according to the present invention by a roof lining in which the flexion axis is formed by an elongated section of the lining part having a lower material density than the adjoining regions. The roof lining has an aperture provided in the lining part for deployment of the lateral impact protection in the event of activation of the lateral impact protection and the flexion axis provided in the lining part.

The roof lining according to the invention offers the advantage that the lining part, in the event of activation of the lateral impact protection, is safely movable about the flexion axis, without tearing away. Thus a defined aperture in the roof lining or in the lining part has been achieved. The gas cushion of the head cushion of the lateral impact protection can thus deploy through the aperture formed in the roof lining according to the present invention by bending or folding down and can open accordingly within the passenger compartment of the vehicle, without sections of the lining part of the roof lining being destroyed or torn away. The fact that the axis of flexion is formed by a section of the lining part, of elongate form, having a lower material density than the adjoining regions entails the advantage that, in contrast to what occurs with a notch, as known from the prior art, the material of the lining is not destroyed. This means that the lining at this point is weakened in terms of its dimensional stability but not in terms of its general strength. This avoids the possibility of rupture of the lining in the region of the axis of flexion when the airbag opens, and hence of parts of the lining being thrown into the passenger compartment.

According to a further development of the invention, the lining can consist of a compacted fiber composite, with the section forming the axis of flexion being uncompacted or at least less compacted than the other regions of the lining.

The advantage in using compacted fiber material is that it results in adequate strength being achieved for the roof lining as a whole. Such strength, especially of the lining part, preferably also permits the lining part or the roof lining to be secured in a freely suspended manner, also provided for according to the invention. Thus, in the roof lining according to the present invention, only retaining elements in, for example, the transverse and/or lengthwise direction of the motor vehicle are required, so that the lining part can be secured on the roof frame in a freely suspended manner.

As a result of the structurally simple configuration of the securing of the roof lining according to the invention, simple assembly of the roof lining on the motor vehicle is also permitted. In particular, no additional masking devices or retaining elements are necessary, for example, in the edge region of the lining part.

In a currently contemplated embodiment, the axis of flexion is provided approximately in the edge region of the lining part. Thus the gas cushion of the lateral impact protection can open parallel to a side window of the vehicle in the event of a collision. As a result, the gas cushion can open protectively between the occupants and the side window of the motor vehicle and thus provide the occupants with appropriate safety in the event of a lateral impact on the vehicle.

The material of construction for the roof lining according to the invention is preferably a fiber material, such as, for example, cotton non-wovens, hemp, kenaf or the like. These fiber materials advantageously result in relative insensitivity, for example, to soiling and wear. Furthermore, the fiber materials are advantageously included among what are known as the renewable raw materials. Other fiber materials made from other raw materials can, of course, also be employed.

In the roof lining according to the invention, the use of an axis of flexion in the lining part also permits a one-piece embodiment of the latter. This offers the advantage that, for example, the lateral impact protection is invisibly mounted behind the lining part, because a predetermined breaking point, tear seams or the like are not necessary in the lining part of the roof lining according to the invention. In addition, the assembly effort when lining the roof is minimized as a result of the one-piece design of the roof lining. Nevertheless, it is, of course, also contemplated for the lining part of the roof lining according to the invention to be of multi-piece design.

Other objects, advantages and novel features of the present invention will become apparent from the following detailed description of the invention when considered in conjunction with the accompanying drawings.

BRIEF DESCRIPTION OF THE DRAWINGS

The single FIGURE schematically shows a cross-section from a portion of a roof lining of a motor vehicle utilizing the present invention.

DETAILED DESCRIPTION OF THE DRAWINGS

Referring now to the drawing, a section of a motor vehicle roof is shown. The roof has a roof frame 1 on which the roof lining according to the present invention for a passenger compartment of a motor vehicle is secured.

The roof lining consists of a lining part 2 secured by a retaining element 3 on the roof frame 1 of the motor vehicle. The retaining element 3 is configured as an approximately S-shaped holder 4. One end 5 of the holder 4 in each case is, for example, screwed (dot-dash line) to the roof frame 1 and a second end 6 of the holder 4 is screwed (dot-dash line) to the lining part 2.

The lining part 2 of the roof lining according to the invention is disposed on the roof frame 1 in what is known as the "freely suspended" manner. An edge 7 of the lining part 2 merely rests with positive fitting on the roof frame 1 or on a side window 19 of the motor vehicle. Thus no additional securing means are provided at the edge 7 of the lining part 2.

A cavity 8 is formed between the roof frame 1 and the lining part 2. A lateral impact protection 9 with a gas cushion 10 or airbag and a gas generator is disposed in the cavity 8. In the illustrated embodiment, a further cavity 11 is provided in which are a duct 12, e.g., for supplying air to the passenger compartment of the motor vehicle, and a cable duct 13, e.g., for electrical wiring of the motor vehicle.

The lining part 2 of the roof lining according to the invention has a channel 14 in which a fold-down grab strap 15 is provided. The grab strap 15 is fixedly connected to the lining part 2 by the holder 4. The channel 14 is lined with a protective covering 16, so that if the grab strap 15 is used the lining part 2 of the roof lining is protected against heavy wear.

According to the invention, an axis of flexion or flexure 17 is provided on the lining part 2 of the roof lining so that, in the event of activation of the lateral impact protection 9, a region 18 of the lining part 2 bordering the axis of flexion 17 is movable about the flexion axis 17.

Thus, a defined downward bending or folding of the lining part 2 by the opening operation of the gas cushion 10 of the lateral impact protection 9 is permitted. An aperture for the deployment of the gas cushion 10 of the lateral impact protection 9 is formed by the movement or bending of the region 18 of the lining part 2 adjoining the flexion axis 17. The adequate aperture on folding out of the region 18 of the lining part 2 is provided here in a manner such that the gas cushion 10 of the lateral impact protection 9 can deploy approximately parallel to the vehicle side window 19, which is shown in a greatly simplified manner. Thus the gas cushion 10 can open approximately in the head region of the occupant of the motor vehicle and protect him accordingly against injury in the event of a lateral impact on the vehicle.

The material used in the lining part 2 is, for example, a fiber material. The lining part 2 is here produced, with the exception of the flexion axis 17, from a compacted fiber material, so that a sufficient rigidity, especially of the lining part 2, is obtained for a freely suspended securing of the roof lining.

The section forming the flexion axis 17 is not compacted, or at least is less compacted than the other regions of the lining. This is indicated in the drawing by the upward-curved section at the flexion axis 17. The flexion axis 17 is thus a less dimensionally rigid or dimensionally stable section of elongated form on the lining part 2. Thus, as a result of the operation of opening of the gas cushion 10 of the lateral impact protection 9, a correspondingly slight bending of the region 18 part 2 adjoining the flexion axis 17 is made possible, without the lining part 2 being destroyed thereby. As a result of this difference in the degree of compaction of the fiber material, this is not destroyed but merely has a different density and hence a different dimensional stability.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Roof lining for a passenger compartment of a motor vehicle, comprising a lining part disposed on a roof frame of the vehicle under which lateral impact protection for an occupant is provided, an aperture provided in the lining part for deployment of lateral impact protection in the event of activation of the lateral impact protection and an axis of flexion operatively provided in the lining part, wherein the axis of flexion is comprised of an elongated section of the lining part which has a lower material density than adjoining regions of the lining part.

2. Roof lining according to claim 1, wherein a region of the lining part adjoining the axis of flexion is configured to be folded down such that the aperture for the deployment of the lateral impact protection (9) comprising a gas cushion is formed.

3. Roof lining according to claim 1, wherein the lining part is operatively secured on the roof frame in a freely suspended manner with at least one retaining element.

4. Roof lining according to claim 3, wherein a region of the lining part adjoining the axis of flexion is configured to be folded down such that the aperture for the deployment of the lateral impact protection comprising a gas cushion is formed.

5. Roof lining according to claim 1, wherein the lining part comprises a compacted fiber material, with the section forming the axis of flexion being uncompacted or at least less compacted than remaining regions of the lining part.

6. Roof lining according to claim 5, wherein a region of the lining part adjoining the axis of flexion is configured to be folded down such that the aperture for the deployment of the lateral impact protection comprising a gas cushion is formed.

7. Roof lining according to claim 6, wherein the lining part is operatively secured on the roof frame in a freely suspended manner with at least one retaining element.

8. Roof lining according to claim 5, wherein the fiber material is a cotton fiber non-woven.

9. Roof lining according to claim 5, wherein the fiber material is hemp.

10. Roof lining according to claim 5, wherein the fiber material is kenaf.

11. Roof lining according to claim 2, wherein the axis of flexion is provided in a edge region of the lining part such that the aperture formed on the folding-down of the lining part is sufficiently large to allow the gas cushion to deploy approximately parallel to a side window of the vehicle.

12. Roof lining according to claim 11, wherein the lining part is operatively secured on the roof frame in a freely suspended manner with at least one retaining element.

13. Roof lining according to claim 12, wherein the lining part comprises a compacted fiber material, with the section forming the axis of flexion being uncompacted or at least less compacted than remaining regions of the lining part.

14. Roof lining according to claim 13, wherein the fiber material is a cotton fiber non-woven.

15. Roof lining according to claim 13, wherein the fiber material is hemp.

16. Roof lining according to claim 13, wherein the fiber material is kenaf.

* * * * *